United States Patent [19]

Matthews et al.

[11] 4,242,793
[45] Jan. 6, 1981

[54] NUT GUIDE FOR INSTALLATION HEAD

[75] Inventors: Horton Matthews, Brighton; Kenneth V. York, Howell; Dale H. Goodsmith, Livonia, all of Mich.

[73] Assignee: Multifastener Corporation, Detroit, Mich.

[21] Appl. No.: 42,658

[22] Filed: May 25, 1979

[51] Int. Cl.³ .............................................. B23P 19/04
[52] U.S. Cl. ........................................ 29/798; 29/809
[58] Field of Search ................. 29/432, 798, 809, 813, 29/816, 818

[56] References Cited

U.S. PATENT DOCUMENTS

| | | | |
|---|---|---|---|
| 3,089,360 | 5/1963 | Steward | 29/809 |
| 3,108,368 | 10/1963 | Steward | 29/432 |
| 3,711,931 | 1/1973 | Ladouceur et al. | 29/432X |
| 3,810,290 | 5/1974 | Grube | 29/798 X |
| 3,811,171 | 5/1974 | Grube | 29/798 X |
| 3,946,478 | 3/1976 | Goodsmith et al. | 29/798 |
| 3,946,479 | 3/1976 | Goodsmith et al. | 29/798 |
| 3,969,808 | 7/1976 | Goodsmith et al. | 29/798 |
| 3,971,116 | 7/1976 | Goodsmith et al. | 29/798 |
| 4,153,989 | 5/1979 | Shinjo | 29/798 X |
| 4,164,072 | 8/1979 | Shinjo | 29/798 X |

Primary Examiner—Ervin M. Combs

[57] ABSTRACT

In a nut installation head having a nut passage receiving a plurality of nuts in side by side relation, a transverse plunger passage communicating with said nut passage, a plunger reciprocating in said plunger passage to install a nut received in said plunger passage, a reciprocal feed for feeding a nut successively into said plunger passage, said head having an apertured nose with said plunger passage extending through said nose and said nut passage extending into said nose and said plunger moving through said nose. The improvement comprises a nut guide for said head, including a cylindrical slot formed in said nose, parallel to and displaced laterally of said plunger passage. A resilient retainer is nested within said slot having an upright recess. A hardened steel dowel of cylindrical shape is positioned within said slot and laterally and guidably nested partly within the retainer recess with a portion of the dowel extending into the plunger passage to guidably support a nut therein. Successive downward movement of the plunger moving said nut along said dowel is adapted to forcefully project the nut into piercing and interlocking registry with a panel underlying said nose, said dowel guidably engaging said nut during its downward movements. Said dowel is adapted for transverse movement and resilient deforming engagement with said retainer as the nut is moved past said dowel. Said dowel under the expansive action of said retainer automatically returns into said plunger passage to its initial nut supporting position.

10 Claims, 7 Drawing Figures

NUT GUIDE FOR INSTALLATION HEAD

FIELD OF THE INVENTION

This invention relates to fastener installation heads having a reciprocating plunger and more particularly to installation heads for self-attaching nut systems, such as pierce nuts and clinch nuts. More specifically the invention is directed to a nut guide assembly for use in conjunction with the reciprocating plunger in a fastener head for supporting a nut within a plunger passage and for successively guiding the nut during its downward movement into interlock with an underlying panel.

DESCRIPTION OF THE PRIOR ART

Installation heads for pierce and clinch nuts generally include a passage receiving the nuts, a transverse plunger passage having a reciprocal plunger and a feed means feeding the nuts from the nut passage beneath the plunger for installation to a panel by the head. Present installation heads are generally designed to accomodate self-attaching nut systems either in bulk or in strip form. Positive and impositive feed installation heads, wherein the nut is fed into the plunger passage by a reciprocating pawl, have been applied to nut systems in strip form or for nuts arranged side by side in a line. With the use of nut strips, the stip is inserted into the plunger passage and the plunger shears the end nut from the strip.

Certain problems have developed in the present positive feed systems wherein suitable guide means are employed for supporting the nut after it has been advanced into the plunger passage and for guiding it in its downward movements through the plunger passage and into piercing and interlocking registry with a metallic panel thereunder. Further, the nut must be accurately located beneath the plunger and guided in the plunger passage during its downward movement. At the same time, the nut must be guidably positioned and retained within the plunger slot, until it completes its downward movement and until under the action of the plunger the nut moves into piercing and interlocking registry with the metallic panel thereunder.

A pierce nut, which may be installed by the disclosed embodiments of the fastener installation head guide means disclosed herein, is shown in U.S. Pat. No. 3,152,628 of Strain, et al, assigned to the Assignee of the instant application. Pierce nuts are generally rectangular fasteners having a flanged end portion and a piercing pilot portion which pierces its own hole in a panel or the like and is secured within the panel opening. Alternately a clinch nut is normally disposed into a pre-pierced panel opening and the nut is deformed to retain the nut in the panel opening. A suitable clinch nut which may be installed by the fastener installation head of this invention, is shown by the U.S. Pat. No. 2,750,660 of Newcomb assigned to the Assignee of the instant application.

More recently pierce and clinch nuts have been developed in a strip form, wherein the nut strip is disposed in the nut passage and the plunger shears the end nut from the strip for installation in a panel or the like, located below the plunger passage. The feed mechanism advances the nut strip to feed an individual nut beneath the plunger for shearing and installation by the plunger. A pierce nut strip system is shown in the U.S. Pat. No. 3,711,931 of Ladouceur, et al, which patent is also assigned to the Assignee of the instant application. Integral pierce and clinch nut strips are also available, wherein the nuts are formed in a continuous strip interconnected by flangeable sections of the strip.

A pierce nut installation head particularly adapted to feed and install pierce nuts in bulk form is shown in the U.S. Pat. No 3,089,360 of Steward assigned to the Assignee of the present application. A further U.S. Pat. No. 3,108,368 of Steward discloses the method of installing and sizing a pierce nut in a panel. The feed system in the patents of Steward may be referred to as an impositive feed, wherein the pierce nuts are resiliently urged into location for installation. The impositive pierce nut head for integral strip nuts is disclosed in U.S. Pat. No. 3,810,291 and a positive feed for integral pierce nut strip is shown in U.S. Pat. No. 3,811,171.

A nut feed mechanism for successively advancing the nuts one at a time into the plunger passage from the nut passage is shown in the Goodsmith, et al U.S. Pat. No. 3,971,116 assigned to the Assignee of the instant application.

The present invention is an improvement over the single plastic cylinder used in the Goodsmith, et al fastener installation head as disclosed in U.S. Pat. No. 3,946,478, FIG. 8 and the ball bearing guide used in the prior Multifastener installation head, U.S. Pat No. 3,108,368. The plastic guide was subject to wear and the ball bearing guide including spring loaded ball bearings is relatively expensive. Both of these patents are assigned to Applicant's assignee.

It is the primary object of the present invention to provide for a fastener installation head which will accomodate pierce or clinch nuts in bulk or strip form, an improved nut guide for such installation heads which is adapted to guidably support and receive the nut within the plunger passage and continuously guidably engage the nut during its downward movement into piercing interlock with said metallic panel.

SUMMARY OF THE INVENTION

The nut guide for the fastener installation head of this invention is particularly adapted to feed and install pierce and clinch nuts of the types described. This type of fastener installation head normally includes a nut passage receiving nuts for installation by the head, a transverse plunger passage communicating with the nut passage and a plunger reciprocating in the plunger passage from a position spaced from the intersection of the passages and through the passage intersection to install a nut received beneath the plunger. A feed mechanism is normally provided to feed a nut from the nut passage to the plunger passage, beneath the plunger, upon actuation of the plunger. One particular problem with the feeding of pierce or clinch nuts in strip form has been accomodating the normal tolerences of the strip, including the spacing between the nuts, the nut tolerences, etc. The dimensional variations in the nut strips may accumulate, causing improper location of nuts within the plunger passage. The nut guide of this invention is particularly adapted to accomodate the dimensional variations in the nut strips, providing reliable feeding and installation of pierce and clinch nuts in either bulk or strip form.

The preferred embodiment of the improved nut guide for a nut installation head is in the form of a nut guide assembly which is supported and nested within the apertured nose which may be mounted on or integral with a telescopic housing section adapted for reciprocal movement relative to the plunger and wherein the plunger passage extends through said nose. The nut passage extends into said nose and the plunger is reciprocally movable through the nose.

In the preferred embodiment, a cylindrical slot is formed within the nose, parallel to and displaced laterally of the plunger passage, and below the nut passage. The nut guide assembly is mounted within said slot and includes a resilient plastic retainer, semicircular in plan, nested within said slot, having an upright recess of a predetermined first radius which faces the plunger passage. An upright metallic dowel of generally cylindrical shape, preferrably of hardened steel, has a predetermined second radius which is greater than the first radius, and is positioned within said undercut slot and laterally and guidably nested partly within the retainer recess. A portion of the dowel extends into the plunger passage to guidably support a nut within said plunger passage after it has been fed thereinto.

The successive downward movement of the plunger moving along and relative to said nose is adapted to forcefully project the nut along the plunger passage and ultimately forcefully project the nut into piercing and interlocking registry with a metallic panel which underlies the nose. During the time that the nut is being moved by the plunger from adjacent the nut passage to the point of engagement with the panel the dowel operatively and guidably engages the nut, maintaining it closely adjacent the opposing wall of the plunger passage. The dowel is disengaged from the nut during its piercing assembly with the panel.

The dowel is adapted for transverse movement within the cylindrical slot and for compressive deforming engagement with the resilient retainer further into its recess during the period the nut is moved past the dowel. Thereafter the dowel under the expansive action of the compressed retainer sleeve is automatically returned thereby partly into the plunger passage to its initial nut supporting position.

In the preferred embodiment the opposite ends of the dowel have tapered conical surfaces initially for supportably engaging the nut and for cooperative engagement with the nut as it is moved forcefully downward by the plunger. Said plunger cams the dowel laterally outward of the plunger passage and into the retainer sleeve. The retainer means, at all times resiliently biases the dowel against the nut during its downward movement for guiding said nut until it is moved to contact with the panel for assembly therewith. The preferred embodiment of the retainer means is a resilient, incompressible half tubular section, which is nested within the cylindrical slot.

The other conical surface for the dowel provides a means of disengaging the dowel from the nut in its succeeding downward movement for assembly with the panel.

The symmetrical form of the dowel, with conical tapered surfaces at opposite ends, provide a means by which upon wear of one conical surface the dowel can be inverted end to end to provide a new conical cam surface for initial registry with the nut at the beginning of its downward movement under the action of the plunger.

The present embodiment of the nut guide assembly includes a retainer sleeve made of a plastic material, preferably polyurethane, which is annular and semicircular in plan and which is incompressible inherently resilient and therefore deformable during its guiding action and for resiliently engaging the dowel and maintaining it against an edge of the nut during its downward movement guiding the same to its position for assembly with the underlying panel. The dowel has a greater diameter than the inside diameter of the annular sleeve.

Other advantages and meritorous features of the guide means for the fastener installation head of this invention will be more fully understood from the following description of the drawings and preferred embodiment, the drawings and the appended claims.

It will be understood that the above drawings illustrate merely a preferred embodiment of the invention, and that other embodiments are contemplated within the scope of the claims hereafter set forth.

DESCRIPTION OF A PREFERRED EMBODIMENT

Figure 1:
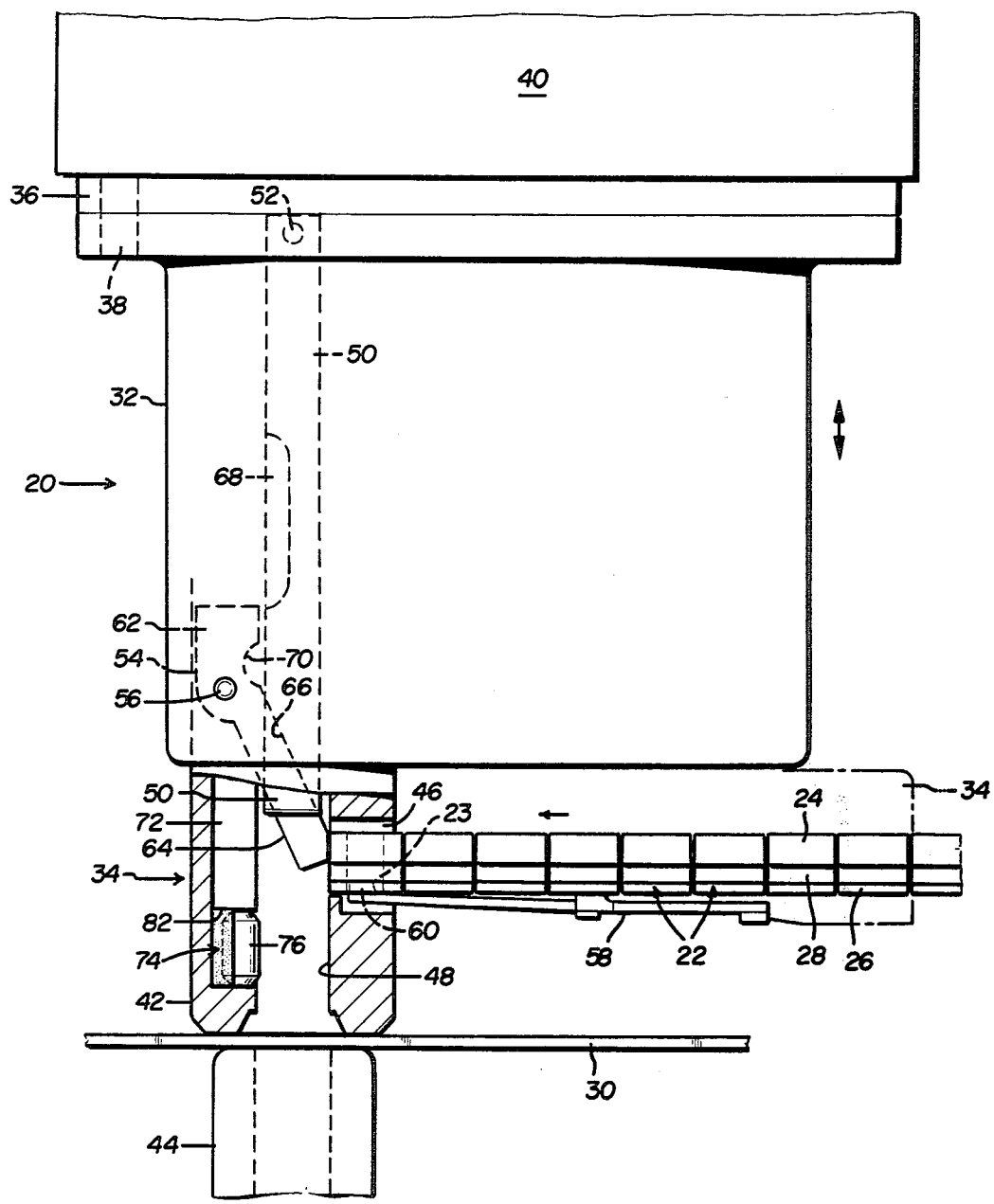
FIG. 1, is a fragmentary side elevational view of a nut installation head incorporating the present nut guide assembly partly broken away and sectioned.

As above described, the fastener installation head with the nut guide assembly of this invention is particularly adapted to feed and install pierce and clinch nuts either in bulk or strip form. The fastener installation head 20, as shown in FIG. 1, is adapted to feed and install a plurality of conventional pierce nuts 22. The disclosed pierce nuts include a threaded bore 23, opposed flanges 24, a self-piercing pilot portion 26 and a groove 28 on opposite sides underlying the flanges for receiving and securing the panel 30 after piercing and assembly.

A more detailed disclosure of pierce nuts may be found in the above referenced U.S. Pat. No. 3,152,628 of Strain, et al. Further, the fastener installation head may be utilized to secure pierce or clinch nuts such as disclosed in the above referenced U.S. Pat. No. 3,711,931 of Ladouceur, et al.

The disclosed embodiment of the fastener installation head 20, with the improved nut guide means, includes two telescopic housing components, including a movable housing component 32, FIG. 1, and a relatively stationary housing component 34. A pierce of clinch nut installation head such as above described may be utilized in combination with a conventional forming die, wherein a panel is simultaneously formed and the pierce or clinch nuts installed into the panel. The disclosed embodiment includes a connector plate 36 depending from die section 40 which is secured to housing component 32 by suitable fasteners 38. Die section 40 may be a conventional ram reciprocating towards and away from the panel 30 or other structural member which is to receive the nuts 22. The disclosed telescopic housing components are retained by any suitable means such as by pins or bolts, not shown, which are disposed through the relatively movable housing component 34 and received in a corresponding slot within the housing component 32, thus permitting relative movement between the housing components. The housing components are normally maintained in an extended position by a coil spring, all pursuant to the disclosure found in U.S. Pat. No. 3,971,116, incorporated herein by reference.

The particular detail and construction of the installation head is not part of the present invention, which is directed to a nut guide assembly for use in conjunction with relatively movable housing component 34, including the apertured nose portion 42. In the present embodiment the fastener installation head includes a separate nose 42, which is secured to the housing component 34.

The panel 30, which is to receive the fasteners 22 installed by the present fastener installation head 20, is shown supported on the nose of the die member 44. Die member 44, fragmentarily shown, supports the panel 30 during installation of the fastener and receives the pierced panel slug 31 shown in FIG. 4 in dash lines. In the present embodiment of the nut installation head there is included a nut passage 46 receiving a plurality of nuts 22.

A transverse plunger passage 48 extends axially of nose 42 and receives reciprocal plunger 50 supported within housing component 32 and is mounted thereon by a support pin 52, FIG. 1.

Reciprocal movements of the die section 40 effects a corresponding reciprocal movement of plunger 50 relative to the housing component 34, upon engagement of the nose 42 on the panel, with the plunger reciprocating within plunger passage 48.

The nuts 22 received in the nut passage 46 are fed into the plunger passage 48, beneath the plunger 50 by a feed mechanism, not shown. This feed mechanism may be similar to the mechanism disclosed in U.S. Pat. No. 3,971,116. The disclosure as to the structure, function and operation of such feed mechanism is incorporated by reference into the present disclosure and is not repeated. The structure, function and operation of the feed mechanism in U.S. Pat No. 3,971,116 is not a part of the present invention. The present invention is directed to a guide mechanism for the nut after it has been fed from the nut passage 46, into the plunger passage 48. It may merely be generally stated that a means is employed which is adapted to successively feed the nuts 22, one at a time, from the nut passage 46 into the plunger passage 48.

In the operation of the installation head forming a part of the background of the present invention there is utilized a stop lever 54 which prevents nuts from entering the plunger passage, except upon downward actuation of the plunger. Elongated restricter arm 58, FIG. 1, located in the nut passage 46 at one end, has an upstanding cam-shaped boss 60, which extends into the nut bore and prevents its withdrawal back into the nut passage. The feed mechanism, by which the nuts 22 are successively advanced, is not shown in the present embodiment. However, a suitable feed mechanism is shown in detail and described in U.S. Pat. No. 3,971,116, wherein the description thereof is incorporated herein by reference. The applicants do not claim the structure and operation of the feed mechanism, except that there is employed a reciprocal feed means for feeding a nut successively from nut passage 46 into the plunger passage. It is the relative movement of the telescopic housing component 32, with respect to the relatively stationary nose 42, housing component 34 and which activates the internal mechanism shown in U.S. Pat. No. 3,971,116. This movement is effective for successively feeding nuts, one at a time, into the nut passage 48. This same movement causes downward movement of plunger 50.

The stop lever 54 prevents entry of nuts into the plunger passage, except upon downward actuation of said plunger. Said stop lever is pivotally connected to the housing component 32 adjacent the plunger by pin 56. In the extended housing position shown in FIG. 1, the upper lever leg 62 is entrapped between a wall of the housing component 32 and said plunger. The lower leg 64 extends at an angle into the plunger passage 48 to block entry of a nut into said passage. It will be understood, however, that any suitable stop means may be employed to limit nuts entering the plunger passage, one at a time.

The plunger includes an inclined surface 66, extending parallel to the lower lever leg 64, located at the distal end of the plunger. A cutout or slot 68 is provided in the plunger of the present embodiment, spaced from the surface 66, to receive the upper leg 62 of the lever. A further cutout 70 is provided in the upper leg to permit free rotation of the upper leg into the slot 68, as the plunger moves downwardly.

Upon actuation of the installation head, by downward movement of the ram or die 40, upper leg 62 wil be positioned for registry with slot 68. Inward feed of the nuts causes the inner nut 22 to engage the nut stop lower leg 64 of lever 54 to rotate said lever about pivot pin 56. Simultaneously with the relative downward movement of the plunger the nut feed mechanism is operative to advance the leading nut 22 rotating said lever out of blocking engagement. The feed mechanism advances the leading nut into plunger passage 48. As said plunger moves downwardly, relative to housing component 34, FIG. 1, the upper lever leg 62 rotates clockwise into clearance slot 68. The nut stop 64 is received in the space 72 defined between nose 42 and plunger 50.

Much of the foregoing disclosure is shown in U.S. Pat. No. 3,971,116, the detail of which forms the background of the invention herein. The present nut guide assembly is adapted for use in conjunction with the present fastener installation head 20 above described with respect to FIG. 1.

IMPROVED NUT GUIDE ASSEMBLY

The function and operation of the embodiment of the present invention directed to the improved nut guide assembly is further described with respect to FIGS. 2 through 7.

The nut guide assembly is generally indicated at 74, FIG. 1, and as shown in detail in FIGS. 2-7. As shown, there is provided an elongated metallic dowel 76, preferably constructed of hardened steel, which has tapered, cone shaped ends 78, which merge with the adjacent cylindrical body of the dowel by the radiused annular surfaces 80. There is formed within the nose 42 the cylindrically shaped slot 82. Said slot is laterally displaced from plunger passage 48 and parallel thereto and is arranged adjacent and below nut passage 46.

The present nut guide assembly includes a resilient retainer means which is nested within said cylindrical slot. In the illustrated embodiment, the resilient retainer means is annular in the form of half an elongated, upright plastic tube 84, preferably constructed of a resilient, incompressible plastic material, such as polyurethane. The tubular section is semicircular in plan and has an outside diameter such as to be snugly received within the cylindrical slot 82, FIGS. 5, 6, and 7.

Said annular retainer means is resilient and incompressible, and has an interior first radius 86 of predetermined dimension, defining a recess which faces plunger passage 48, spaced laterally therefrom. For this, a polyurethane or equivalent plastic tube is longitudinally split. Slot 82 has a radius substantially equal to the exterior radius of sleeve 74 for a snug fit therein.

The nut guide assembly further includes an upright cylindrical dowel 76 of generally barrel shape having a predetermined second radius which is greater than said first radius at 86. Its opposite ends are tapered and cone shaped at 78. Said dowel is guidably nested within the cylindrical slot 82 in said nose and partly nested within the inwardly opening recess 86 of retainer sleeve 84. The dowel retainer being semi-tubular provides a resilient backing and support for dowel 76 throughout most of its height. This provides greatly increased surface contact with the dowel than could be afforded by a flat backing. The retainer is easily formed from a tubular member.

Figure 5:
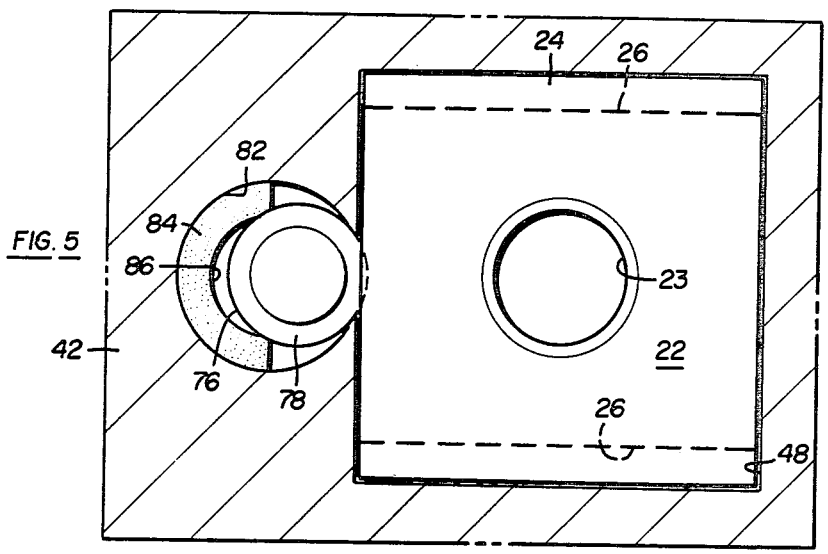
FIG. 5, is a plan section on an increased scale taken in the direction of arrows 5—5 of FIG. 2.
Figure 2:
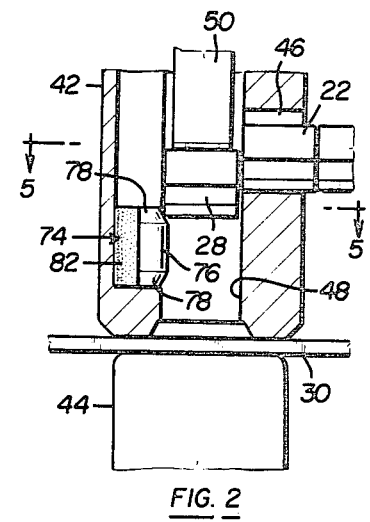
FIG. 2, is a vertical section of the apertured nose of FIG. 1 illustrating the positioning of a nut supported upon the guide dowel.

The initial positioning of the dowel 76 within the retainer sleeve 84, is shown in FIG. 5. Since the radius of the dowel is greater than the radius of the retainer recess 86, said dowel is only partly nested within the retainer recess. Initial downward movement of housing component 32 advances the first nut from the position of FIG. 1 into passage 48. In FIG. 2 the nut is shown guidably supported upon taper 78 of said dowel.

Figure 6:
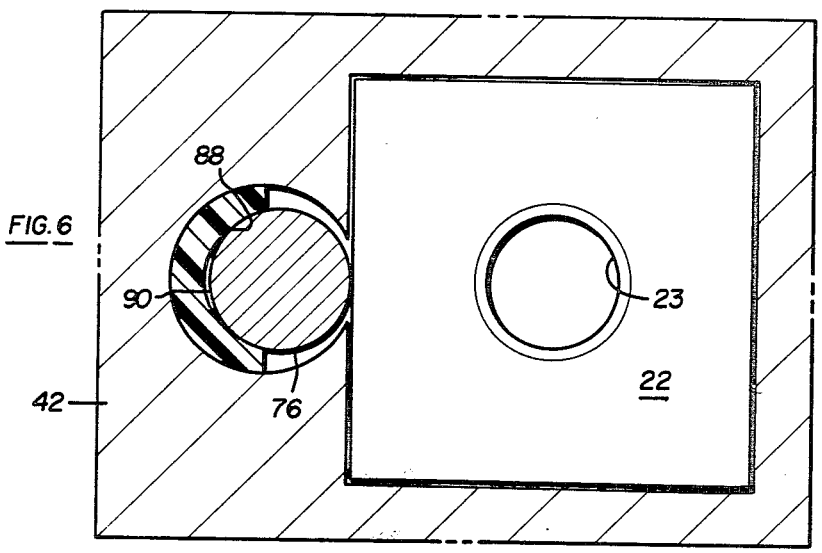
FIG. 6, is a similar view taken in the direction of arrows 6—6 of FIG. 3.

In operation, as the plunger 50 forcefully moves the nut 22 downwardly from the position shown in FIG. 2, said nut cams against the adjacent conical surface 78 and causes the dowel 76 to move laterally inwardly with respect to the retainer recess 86, resiliently compressing and distorting the retainer sleeve 84, as shown at 88 in FIG. 6. Since the radius of the dowel is greater than the internal radius of the semicircular sleeve 84, there is sufficient space 90 left between said dowel and sleeve.

Figure 3:
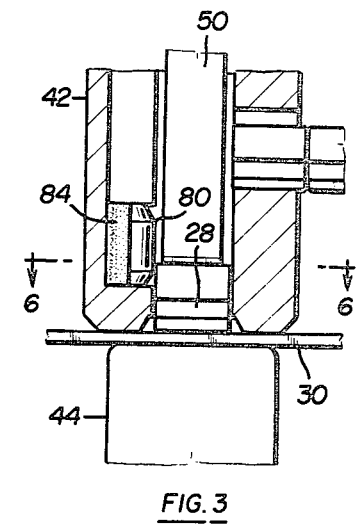
FIG. 3, is a similar view illustrating the positioning of the nut as guided downwardly within the plunger passage under the action of the plunger up to engagement with the underlying panel.
Figure 7:
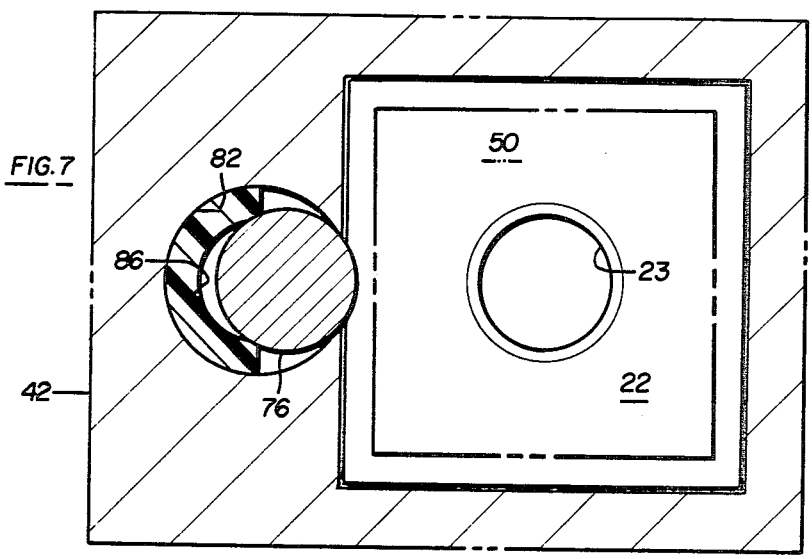
FIG. 7, is a similar view taken in the direction of arrows 7—7 of FIG. 4.

In the position of the dowel in FIG. 6, the nut 22 is guidably engaged thereby, so as to register with the opposing surface of the plunger passage 48 as the nut moves to the position shown in FIG. 3. As soon as the upper edge of the nut begins to clear the lower tapered surface 78 of the dowel, the dowel is free to return to its initial position shown in FIG. 7 under the resiliency and expansive action of the originally distorted and compressed retainer sleeve shown in FIG. 6.

The dowel has thus moved back to its initial position corresponding to the position shown in FIG. 2 and is ready for the next projection of a nut into the plunger passage, supporting it in advance of the downwardly moving plunger.

Figure 4:
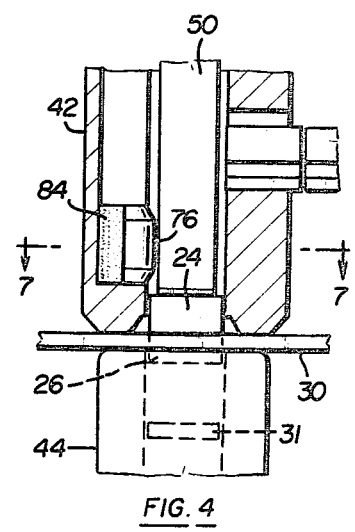
FIG. 4, is a similar view illustrating the final position of the nut as forcefully projected into interlocking registry with the underlying panel and with the dowel automatically returned to the initial position shown in FIG. 2.

Though not forming a part of the present invention, completion of the downward stroke of the plunger, to the relative position shown in FIG. 4, has moved the nut to a piercing interlocking relationship with the panel 30. The successive upward movement of the ram or die section 40, will retract the plunger 50 from its lowest position, FIG. 4, to the relative position shown in said FIG. 1.

One characteristic of the retainer means of the present invention is that it is resiliently distortable as shown in FIG. 6, such that during the period that the nut is being guided by the dowel from the position shown in FIG. 2 and through the positioning shown in FIG. 3, the retainer sleeve is resiliently biasing the dowel against the outer surface of the nut. Thus the nut is guidably engaged during its downward movement, past the position shown in FIG. 3, where it is then in engagement with the panel 30, fragmentarily shown, ready for the final assembly operation of the nut with respect to the panel.

As the nut moves from the position shown in FIG. 2, toward the position in FIG. 3, its lower edge engages the upper taper 78 of the dowel, camming it laterally into slot 82. The nut moves smoothly onto the cylindrical surface of the dowel since the tapered portions 78 at their inner annular ends are radiused at 80. When the upper tapered surface has become worn to a degree, the dowel may be reversed 180° and continued to be used. As shown in FIGS. 1, 2, 3 and 4 the bottom surface of slot 82 include transverse face to guidably receive the dowel bottom for guiding its transverse movements.

Cylindrical slot 82 has a lateral opening of rectangular shape of a width less than the diameter of dowel 76. This opening limits inward movement of the dowel into passage 48 to the position shown in FIGS. 2 and 4.

Having described our invention reference should now be had to the following claims.

We claim:

1. In a nut installation head having a nut passage rceiving a plurality of nuts, a transverse plunger passage communicating with said nut passage, a plunger reciprocating in said plunger passage through the intersection of said passages to install a nut received in said plunger passage from said nut passage, a feed means feeding a nut successively into said plunger passage, said head having an apertured nose portion, said plunger passage extending through said nose portion, said nut passage extending into said nose portion, and said plunger being movable through said nose portion, the improvement which comprises a nut guide for said head including:

a generally cylindrical slot within said nose portion parallel to and displaced laterally of said plunger passage, below said nut passage;

and a nut guide assembly within said slot including a split semi-tubular resilient retainer means nested within said slot having a semi-tubular recess parallel to said plunger passage with a predetermined internal first radius, facing said plunger passage;

and a metallic dowel of generally cylindrical shape having a predetermined second external radius, greater than said first radius, positioned within said slot parallel to said plunger passage, laterally and guidably nested partly within said retainer recess, with surface portions thereof throughout its height bearing against said retainer means, a radial portion of said dowel extending into said plunger passage to guidably support a nut within said plunger passage;

successive downward movement of said plunger moving said nut along said dowel and adapted to forcefully project said nut into piercing and interlocking registry with a metallic panel underlying said nose, said dowel guidably engaging said nut during its downward movement;

said dowel adapted for transverse movement and resilient deforming engagement with said retainer means further into its recess as said nut is moved past said dowel, said dowel under the expansive action of said retainer means automatically returning into said plunger passage to its initial nut supporting position.

2. In the nut guide assembly of claim 1, the opposite ends of said dowel having tapered conical surfaces;

said nut on downward movement engaging one conical end surface, laterally camming said dowel outwardly of said plunger passage into said retainer means, said retainer means yieldably biasing said dowel against said nut during its downward movement.

3. In the nut guide assembly of claim 2, the other conical surface releasing said nut as it is forcefully moved thereby into assembled interlocking registry with said panel.

4. In the nut guide assembly of claim 2, said resilient retainer means being of a resilient incompressible plastic material.

5. In the nut guide assembly of claim 2, said resilient retainer means being of a polyurethane.

6. In the nut guide assembly of claim 2, said resilient retainer means being in the form of a split annular tube, semicircular in plan and snugly nested within said cylindrical slot.

7. In the nut guide assembly of claim 2, said cylindrical slot having transverse bottom face guidably receiving said dowel for transverse movements, said slot having a lateral opening of a width less than the diameter of said dowel limiting movements of said dowel into said plunger passage.

8. In the nut guide assembly of claim 2, said cone-shaped end portions blending into said dowel in radiused surfaces.

9. In the nut guide assembly of claim 2, said dowel being adjustable 180° end to end within said cylindrical slot after wear of one of its tapered conical surfaces.

10. A nut installation head having a nut passage receiving a plurality of nuts, a transverse plunger passage communicating with said nut passage, a plunger reciprocating in said plunger passage through the intersection of said passages to install a nut received in said plunger passage from said nut passage, a feed means feeding a nut successively into said plunger passage, said head having an apertured nose portion, said plunger passage extending through said nose portion, said nut passage extending into said nose portion, and said plunger being movable through said nose portion, the improvement which comprises a nut guide for said head including;

a generally cylindrical slot within said nose portion parallel to and displaced laterally of said plunger passage, below said nut passage;

and a nut guide assembly within said slot including a split semi-tubular resilient retainer means nested within said slot having a semi-tubular recess parallel to said plunger passage with a predetermined internal first radius, facing said plunger passage;

and a metallic dowel of generally cylindrical shape having a predetermined second external radius, greater than said first radius, positioned within said slot parallel to said plunger passage, laterally and guidably nested partly within said retainer recess, with surface portions thereof throughout its height bearing against said retainer means, a radial portion of said dowel extending into said plunger passage to guidably support a nut within said plunger passage;

successive downward movement of said plunger moving said nut along said dowel and adapted to forcefully project said nut into piercing and interlocking registry with a metallic panel underlying said nose, said dowel guidably engaging said nut during its downward movement;

said dowel adapted for transverse movement and resilient deforming engagement with said retainer means further into its recess as said nut is moved past said dowel, said dowel under the expansive action of said retainer means automatically returning into said plunger passage to its initial nut supporting position;

the opposite ends of said dowel having tapered conical surfaces;

said nut on downward movement engaging one conical end surface, laterally camming said dowel outwardly of said plunger passage into said retainer means, said retainer means yieldably biasing said dowel against said nut during its downward movement;

said cylindrical slot having transverse bottom face guidably receiving said dowel for transverse movements, said slot having a lateral opening of a width less than the diameter of said dowel limiting movements of said dowel into said plunger passage.

* * * * *